US009261156B2

(12) United States Patent
Vetor et al.

(10) Patent No.: US 9,261,156 B2
(45) Date of Patent: Feb. 16, 2016

(54) FLEXIBLE SPRING MEMBERS AS WELL AS GAS SPRING ASSEMBLIES AND METHODS OF MANUFACTURE INCLUDING SAME

(71) Applicant: Firestone Industrial Products Company, LLC, Indianapolis, IN (US)

(72) Inventors: Aaron E. Vetor, Summitville, IN (US); David D. Jackson, Jr., Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/181,358

(22) Filed: Feb. 14, 2014

(65) Prior Publication Data

US 2014/0225341 A1 Aug. 14, 2014

Related U.S. Application Data

(60) Provisional application No. 61/764,826, filed on Feb. 14, 2013.

(51) Int. Cl.
*F16F 9/04* (2006.01)
*B60G 11/27* (2006.01)
*B60G 17/052* (2006.01)

(52) U.S. Cl.
CPC .............. *F16F 9/0445* (2013.01); *B60G 11/27* (2013.01); *B60G 17/0521* (2013.01); *B60G 2202/152* (2013.01); *B60G 2204/126* (2013.01); *B60G 2206/42* (2013.01)

(58) Field of Classification Search
CPC ......... F16F 9/04; F16F 9/0409; F16F 9/0445; F16F 9/05; B60G 11/27; B60G 17/0521; B60G 2202/152; B60G 2204/126; B60G 2206/42

USPC ............ 267/64.24, 64.27, 122, 64.11, 64.19, 267/64.21, 64.23; 280/124.157, 124.16
See application file for complete search history.

(56) References Cited

U.S. PATENT DOCUMENTS

| 4,787,608 | A | | 11/1988 | Elliott | |
|---|---|---|---|---|---|
| 5,253,850 | A | | 10/1993 | Burkley | |
| 5,580,033 | A | * | 12/1996 | Burkley et al. | ............ 267/64.27 |
| 5,934,652 | A | * | 8/1999 | Hofacre et al. | ............ 267/64.27 |
| 6,361,028 | B1 | | 3/2002 | Hubbell | |
| 6,398,198 | B1 | * | 6/2002 | Okamoto | ................... 267/64.27 |
| 6,691,989 | B1 | * | 2/2004 | Leonard | ..................... 267/64.28 |
| 7,604,032 | B2 | * | 10/2009 | Maruoka | ....................... 152/540 |
| 7,614,615 | B2 | * | 11/2009 | Egolf | .......................... 267/64.19 |
| 7,784,771 | B2 | * | 8/2010 | Leonard et al. | ............ 267/64.27 |
| 2004/0089096 | A1 | * | 5/2004 | Bostick et al. | .................. 74/552 |

(Continued)

*Primary Examiner* — Laura Freedman
(74) *Attorney, Agent, or Firm* — Jason A. Houser; Fay Sharpe LLP

(57) ABSTRACT

Flexible spring members can include a flexible spring wall and at least one girdle hoop. The flexible spring wall can include a plurality of convoluted wall portions disposed in longitudinally-spaced relation to one another. The girdle hoop can take the form of an annular ring that is at least partially formed from a non-metallic material and can be positioned longitudinally between adjacent ones of the plurality of convoluted wall portions. The girdle hoop can be at least partially embedded within the flexible spring wall and can operate to substantially inhibit radially-outward expansion of the flexible spring wall during inflated conditions and/or use. Gas spring assemblies and methods of manufacture can include one or more of such flexible spring members.

22 Claims, 8 Drawing Sheets

(56) References Cited

U.S. PATENT DOCUMENTS

| | | | |
|---|---|---|---|
| 2009/0114332 A1* | 5/2009 | Daghini et al. | 152/540 |
| 2011/0266728 A1* | 11/2011 | Bank | 267/64.27 |
| 2012/0313303 A1* | 12/2012 | Gedenk et al. | 267/64.27 |
| 2013/0192067 A1* | 8/2013 | Leonard | 29/896.9 |
| 2013/0270753 A1* | 10/2013 | Balachonzew et al. | 267/64.27 |

* cited by examiner

FLEXIBLE SPRING MEMBERS AS WELL AS GAS SPRING ASSEMBLIES AND METHODS OF MANUFACTURE INCLUDING SAME

This is a non-provisional of Application No. 61/764,826, filed on Feb. 14, 2013, which is hereby incorporated herein by reference in its entirety.

BACKGROUND

The subject matter of the present disclosure broadly relates to the art of gas spring devices and, more particularly, to flexible spring member constructions that include improved features and/or performance characteristics. Such flexible spring members can be included in or otherwise form a part of gas spring assemblies, suspension systems and/or methods of manufacture.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, it may be desirable to reduce the overall weight of a vehicle suspension system. Reducing the weight of various components of the one or more gas spring assemblies of a suspension system can be one contributing factor to achieving such a goal. Known flexible spring member designs have been formed from elastomer material and include one or more endless, annular reinforcing elements embedded along and end of the flexible wall. In many cases, known reinforcing elements are formed from metal material, such as a length of solid metal rod that has been configured into an endless, annular ring or an elongated length of twisted wire that has been wound or otherwise woven into an endless, annular ring. While such known reinforcing elements generally provide sufficient reinforcing strength to achieve the desired performance of the flexible spring member, such known reinforcing elements also contribute to the overall weight of the gas spring assembly.

Notwithstanding the widespread usage and overall success of the wide variety of flexible spring member constructions that are known in the art, it is believed that a need exists to meet these competing goals while still retaining comparable or improved performance, ease of manufacture, ease of assembly, ease of installation and/or reduced cost of manufacture. Thus, it is believed to be generally desirable to develop new constructions and/or designs that may advance the art of gas spring devices.

BRIEF SUMMARY

One example of a flexible spring member in accordance with the subject matter of the present disclosure can include a flexible spring wall that is at least partially formed from an elastomeric material. The flexible spring wall can have a longitudinal axis and can extend longitudinally between opposing first and second ends. The flexible spring wall can extend peripherally about the longitudinal axis and can include a plurality of convoluted wall portions disposed in longitudinally-spaced relation to one another. At least one girdle hoop in the form of an annular ring can be at least partially formed from a non-metallic material and can extend peripherally about the longitudinal axis. The at least one girdle hoop can be positioned longitudinally between adjacent ones of the plurality of convoluted wall portions with the at least one girdle hoop at least partially embedded within the flexible spring wall.

One example of a gas spring assembly in accordance with the subject matter of the present disclosure can include a first end member configured for securement to an associated structural component. A second end member can be spaced from the first end member such that a longitudinal axis is formed therebetween. The second end member can be configured for securement to another associated structural component. A flexible spring member can include a flexible spring wall at least partially formed from an elastomeric material. The flexible spring wall can extend lengthwise between opposing first and second ends and peripherally about the axis with the first end secured in a substantially fluid-tight manner to the first end member and the second end secured in a substantially fluid-tight manner to the second end member such that a spring chamber is at least partially formed therebetween. The flexible spring wall can include a first convoluted wall portion and a second convoluted wall portion that is spaced longitudinally from the first convoluted wall portion. A girdle hoop can be at least partially formed from a non-metallic material. The girdle hoop can extend peripherally about the longitudinal axis and can be positioned between the first and second convoluted wall portions. The girdle hoop can be at least partially embedded within the flexible spring wall and can be operative to substantially inhibit radially-outward expansion of the flexible spring wall during use of the gas spring assembly.

One example of a suspension system in accordance with the subject matter of the present disclosure can include a pressurized gas system that can include a pressurized gas source and a control device. The suspension system can also include at least one gas spring assembly according to the foregoing paragraph that is disposed in fluid communication with the pressurized gas source through the control device such that pressurized gas can be selectively transferred into and out of the spring chamber of the at least one gas spring assembly.

One example of a method of manufacturing a gas spring assembly in accordance with the subject matter of the present disclosure can include providing a flexible spring member that includes a flexible spring wall and at least one girdle hoop in the form of an annular ring that is at least partially formed from a non-metallic material. The flexible spring wall can be at least partially formed from an elastomeric material. Additionally, the flexible spring wall can have a longitudinal axis and can extend longitudinally between opposing first and second ends. The flexible spring wall can extend peripherally about the longitudinal axis and can include a plurality of convoluted wall portions disposed in longitudinally-spaced relation to one another. The at least one girdle hoop can extend peripherally about the longitudinal axis and can be positioned longitudinally between adjacent ones of the plurality of convoluted wall portions with the at least one girdle hoop at least partially embedded within the flexible spring wall. The method can also include providing a first end member, and securing the first end member along the first end of the flexible spring wall such that a substantially fluid tight seal is formed between the flexible spring member and the first end member.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
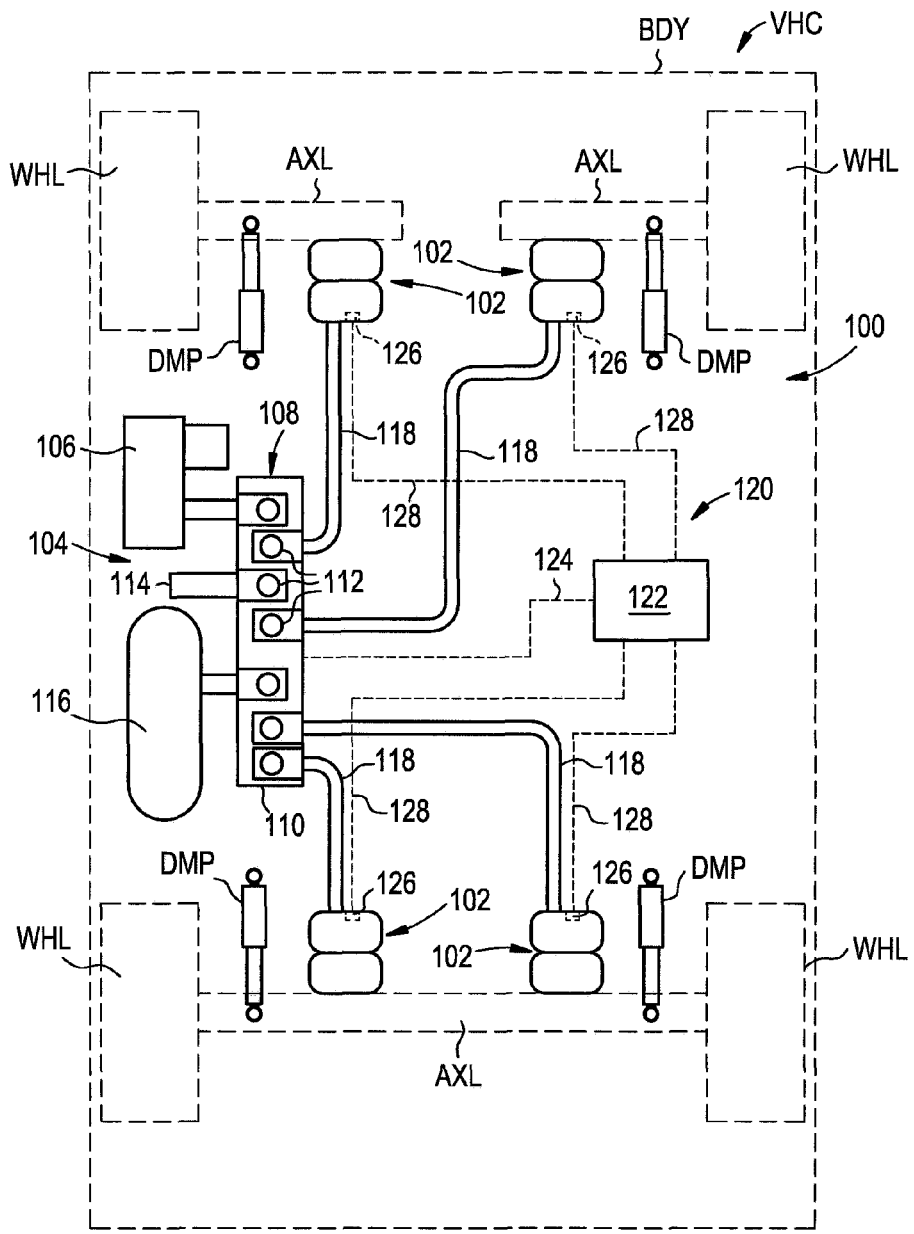
FIG. 1 is a schematic representation of one example of a suspension system of an associated vehicle.
Figure 2:
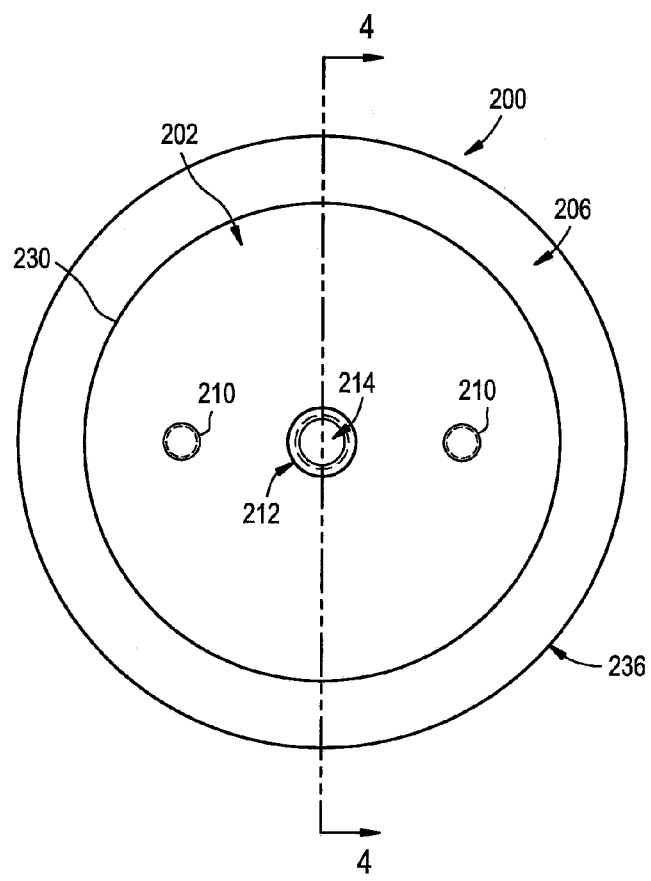
FIG. 2 is a top plan view of one example of a gas spring assembly including a flexible spring member in accordance with the subject matter of the present disclosure.
Figure 3:
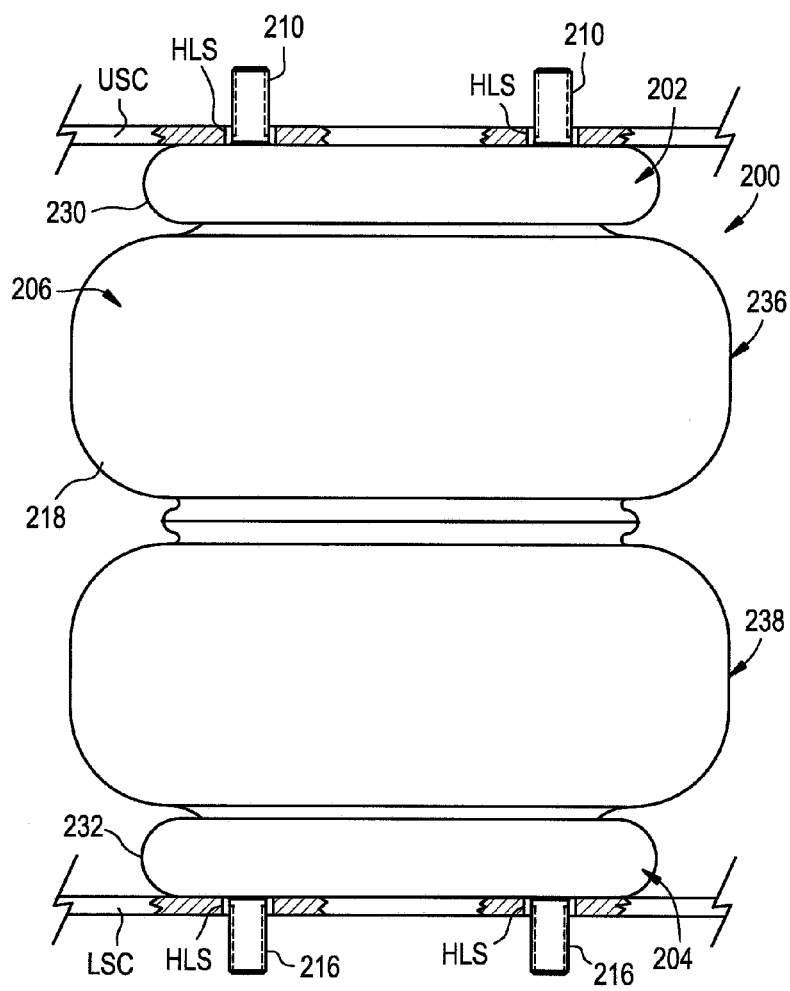
FIG. 3 is a side view of the gas spring assembly in FIG. 2.
Figure 4:
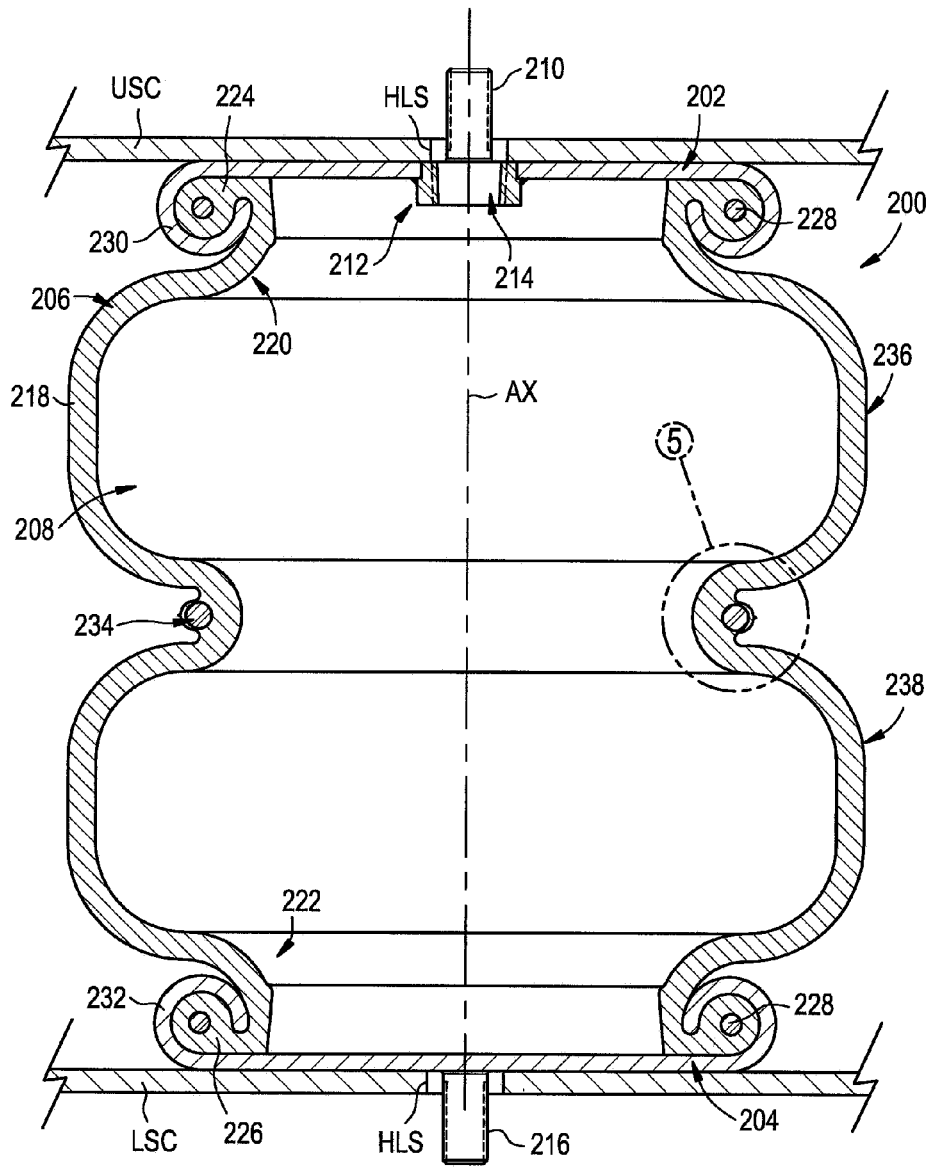
FIG. 4 is a cross-sectional side view of the gas spring assembly in FIGS. 2 and 3 taken from along line 4-4 in FIG. 2.
Figure 5:
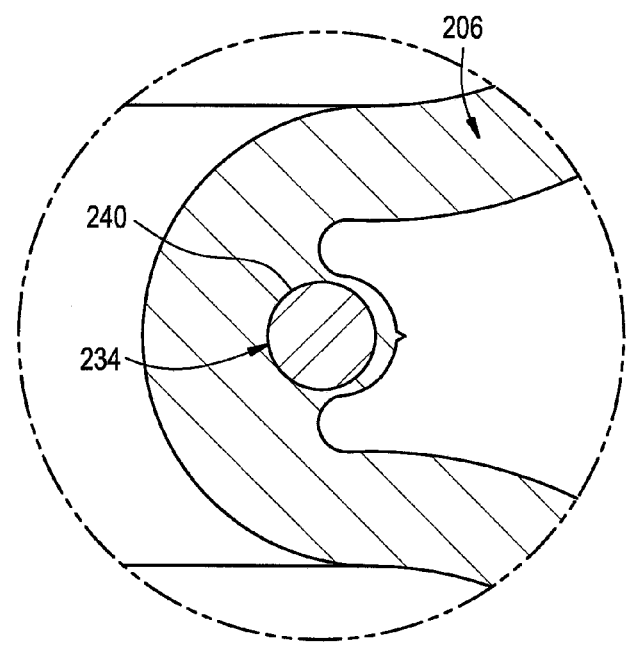
FIG. 5 is an enlarged view of the portion of the flexible spring member in FIGS. 2-4 identified as Detail 5 in FIG. 4.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a convoluted-type construction. It is to be understood, however, that gas spring assemblies of any combination of one or more other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration and/or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

One example of a gas spring assembly 200 is shown in FIGS. 2-5 as having a longitudinally-extending axis AX (FIG. 4) and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 (FIG. 4) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 3 and 4, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts or other securement devices (not shown), for example.

Additionally, one or more gas transfer ports can optionally be provided to permit fluid communication with spring chamber 208, such as may be used for transferring pressurized gas into and/or out of the spring chamber. For example, a connection can be provided on or along one of the end members (e.g., end member 202) such as may be used for attachment of a gas transfer line (e.g., one of gas transfer lines 118 in FIG. 1). In the exemplary arrangement shown in FIGS. 2-4, a connector fitting 212 is provided on or along one of the end members (e.g., end member 202), such as may be used for attachment of one of gas transfer lines 118 in FIG. 1, for example, and can include a passage 214 extending through the end member in fluid communication with spring chamber 208.

End member 204 can be secured along a second or lower structural component LSC, such as an axle AXL in FIG. 1, for example, in any suitable manner. As one example, lower structural component LSC could include one or more mounting holes HLS extending therethrough. One or more securement devices, such as mounting studs 216, for example, can be included along end member 204. In some cases, the one or more securement devices (e.g., mounting studs 216) can project outwardly from end member 204 and can be secured thereon in a suitable manner, such as, for example, by way of a flowed-material joint (not shown) or a press-fit connection (not identified). Additionally, such one or more securement devices can extend through mounting holes HLS in lower structural component USC and receive one or more threaded nuts or other securement devices (not shown), for example. As an alternative to one or more of mounting studs 210 and/or 216, one or more threaded passages (e.g., blind passages and/or through passages) could be used in conjunction with a corresponding number of one or more threaded fasteners.

Flexible spring member 206 can be of any suitable size, shape, construction and/or configuration. As one example, flexible spring member 206 can include a flexible wall 218 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 218 is shown extending in a longitudinal direction between opposing ends 220 and 222. In some cases, flexible wall 218 can, optionally, include a mounting bead disposed along either one or both of ends 220 and 222. In the arrangement shown in FIGS. 2-4, mounting beads 224 and 226 are shown as being respectively disposed along ends 220 and 222. In some cases, the mounting beads can, optionally, include a reinforcing element, such as an endless, annular bead core 228, for example.

It will be appreciated, that end members 202 and 204 can be of any suitable type, kind, configuration and/or construction, and that the ends of flexible spring member 206 can be secured on, along and/or otherwise interconnected between end members 202 and 204 in any suitable manner. As one example, end members 202 and 204 can be of a type commonly referred to as a bead plate. End member 202 is shown as being secured to end 220 of flexible wall 218 using a crimped-edge connection in which an outer peripheral edge 230 of end member 202 is crimped or otherwise deformed around mounting bead 224 such that a substantially fluid-tight seal is formed therebetween. Similarly, end member 204 is shown as being secured to end 222 of flexible wall 218 using a crimped-edge connection in which an outer peripheral edge 232 is crimped or otherwise deformed around mounting bead 226 such that a substantially fluid-tight seal is formed therebetween.

Gas spring assembly 200 is shown as being of a type commonly referred to as a convoluted or bellows-type construction, and it will be appreciated that any suitable type or kind of convoluted spring construction can be used. As such, a flexible spring member according to the subject matter of the present disclosure can have any suitable number of one or more girdle hoops that are spaced apart from the ends of the flexible spring member to form a corresponding number of two or more convoluted wall portions. In the exemplary arrangement shown in FIGS. 2-5, flexible spring member 206 includes a girdle hoop 234 disposed approximately midway along flexible wall 218 between ends 220 and 222. A convoluted wall portion 236 extends between girdle hoop 234 and end member 202, and a convoluted wall portion 238 extends between the girdle hoop and end member 204. In a preferred arrangement, girdle hoop 234 is at least partially embedded within flexible wall 218, and can function to retard or otherwise inhibit radially-outward expansion of the flexible wall during use under inflated and/or use conditions.

Known flexible spring member constructions can include girdle hoops formed from metallic material, such as length of solid metal rod that has been configured into an endless, annular ring or an elongated length of twisted wire that has been wound or otherwise woven into an endless, annular ring. A flexible spring member in accordance with the subject matter of the present disclosure differs from conventional constructions in that one or more girdle hoops of a flexible spring member in accordance with the subject matter of the present disclosure can be at least partially formed from a non-metallic material.

In the exemplary arrangement shown in FIGS. 2-5, girdle hoop 234 is shown as being formed into an endless, annular ring from a unitary mass of non-metallic material such that girdle hoop 234 includes an outer surface 240. One example of a suitable non-metallic material from which girdle hoop 234 could be formed is an elastomeric material, such as a natural rubber compound, a synthetic rubber compound and/or a thermoplastic elastomer compound, for example. In a preferred arrangement, the elastomeric material from which the girdle hoop can be at least partially formed can have one or more physical or material properties that differ from these physical or material properties of the elastomeric material from which the flexible wall is at least partially formed. For example, the elastomeric material of girdle hoop 234 could have a higher durometer, greater rigidity or stiffness and/or increased strength compared to the elastomeric material from which flexible wall 218 is at least partially formed.

Another example of a non-metallic material from which a girdle hoop of a flexible spring member in accordance with the subject matter of the present disclosure can be at least partially formed is a thermoplastic material that is comparatively rigid relative to the elastomeric material from which the flexible wall is at least partially formed. In some cases a thermoplastic material, such as a reinforced (e.g., glass-filled) and/or high-strength thermoplastic material (e.g., polyamide, polyester, polyurethane and/or polypropylene). For example, the thermoplastic material of girdle hoop 234 could have a higher durometer, greater rigidity or stiffness and/or increased strength compared to the elastomeric material from which flexible wall 218 is at least partially formed.

Figure 6:
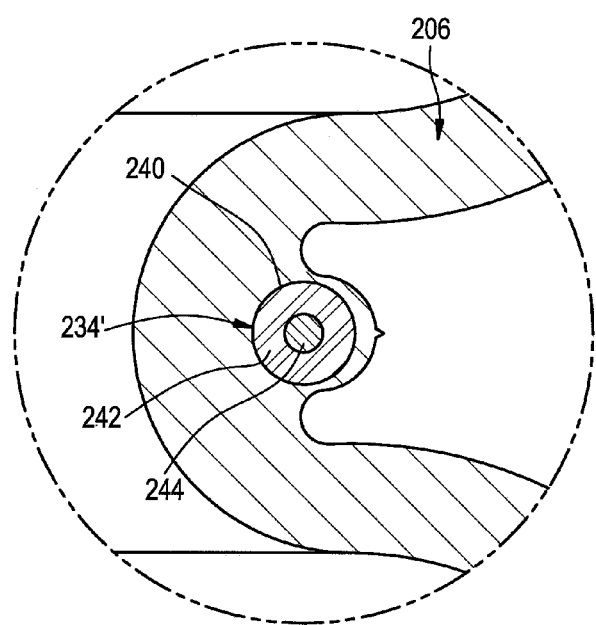
FIG. 6 is an enlarged view of one example of an alternate construction of the portion of the flexible spring member in FIG. 5.

As indicated above, a flexible spring member in accordance with the subject matter of the present disclosure can include one or more girdle hoops that are at least partially formed from a non-metallic material. Another example of a girdle hoop suitable for use in such a construction is shown in FIG. 6 as girdle hoop 234' that includes an outer surface 240. Girdle hoop 234' differs from girdle hoop 234 in that girdle hoop 234' includes an outer casing 242 and an inner core 244. Outer casing 242 can be formed from a non-metallic material, such as an elastomeric material (e.g. natural rubber, synthetic rubber and thermoplastic elastomer) or a non-elastomeric thermoplastic material (e.g. polyamide, polyester, polyurethane and/or polypropylene) that is different from the elastomeric material from which flexible wall 218 is at least partially formed. In a preferred arrangement, inner core 244 will be formed from a material having physical and/or material properties that are different from the material from which outer casing 242 is at least partially formed. In a preferred arrangement, the material from which inner core 244 is at least partially formed can have a higher durometer or hardness, a greater rigidity or stiffness, and/or increased strength compared to the material from which outer casing 242 is at least partially formed. In some cases, outer casing 242 can be formed from an elastomeric material or a non-elastomeric thermoplastic material and inner core 244 can be formed from an elastomeric material or a non-elastomeric thermoplastic material that is different from the material from which outer casing 242 is formed. In other cases, outer casing 242 can be formed from an elastomeric material or a non-elastomeric thermoplastic material and inner core 244 can be formed from a metallic material, such as a length of solid metal rod that has been configured into an endless, annular ring.

Figure 7:
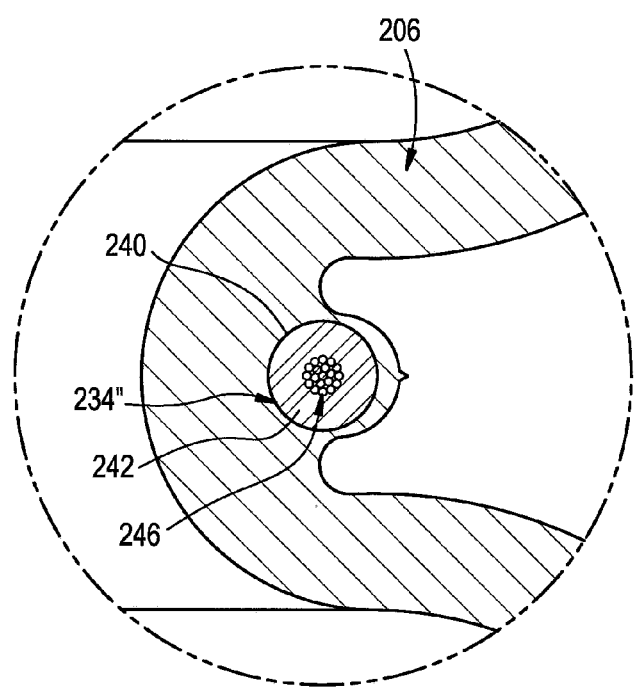
FIG. 7 is an enlarged view of another example of an alternate construction of the portion of the flexible spring member in FIG. 5.

Still another example of a girdle hoop suitable for use in constructing a flexible spring member in accordance with the subject matter of the present disclosure is shown in FIG. 7 as girdle hoop 234" that includes an outer surface 240. Girdle hoop 234" can be similar in construction to girdle hoop 234' and can include an outer casing 242 and an inner core 246. However, girdle hoop 234" differs from girdle hoop 234' in that inner core 246 of girdle hoop 234" can be formed from an elongated length of metallic wire that has been wound, twisted or otherwise woven into an endless, annular ring.

Figure 8:
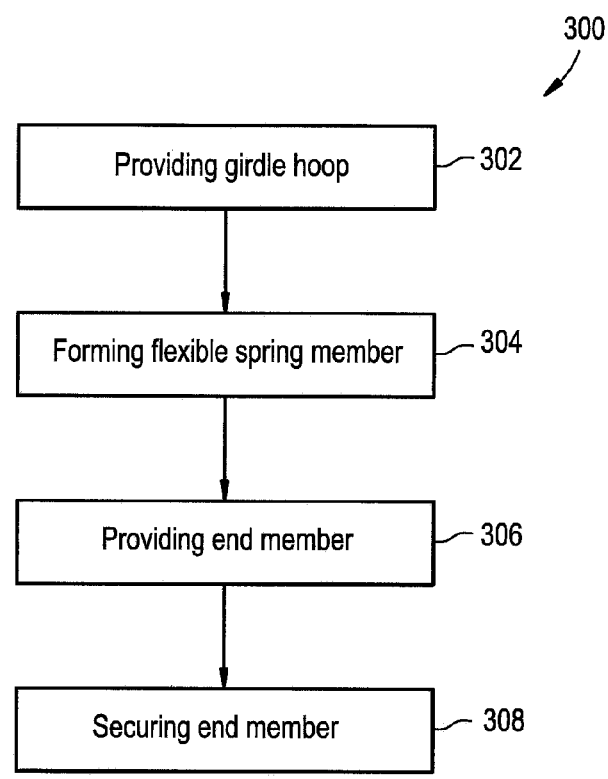
FIG. 8 is one example of a method of manufacturing a gas spring assembly including a flexible spring member in accordance with the subject matter of the present disclosure.

With reference to FIG. 8, one example of a method 300 of manufacturing a gas spring assembly (e.g., gas spring assembly 102 and/or 200) in accordance with the subject matter of the present disclosure includes providing one or more girdle hoops (e.g. girdle hoop 234, 234', and 234") that is at least partially formed from a non-metallic material, as is represented by item number 302. Method 300 can also include forming a flexible spring member (e.g. flexible spring member 206) from a flexible wall (e.g. flexible wall 218) with the one or more girdle hoops at least partially embedded within the flexible wall, as is represented by item number 304. Method 300 can further include providing an end member (e.g. one of end members 202 and 204) and securing the end member across an end (e.g. one of ends 220 and 222) the flexible spring member to at least partially formed a spring chamber (e.g. spring chamber 208), as is represented by item numbers 306 and 308, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A flexible spring member comprising:
a flexible spring wall at least partially formed from an elastomeric material, said flexible spring wall having a longitudinal axis and extending longitudinally between opposing first and second ends, said flexible spring wall extending peripherally about said longitudinal axis and including a plurality of convoluted wall portions disposed in longitudinally-spaced relation to one another; and,
at least one girdle hoop in the form of an annular ring extending peripherally about said longitudinal axis and positioned longitudinally between adjacent ones of said plurality of convoluted wall portions with said at least one girdle hoop at least partially embedded within said flexible spring wall, said at least one girdle hoop including an inner core and an outer casing that is at least partially formed from a hoop elastomeric material that is different from said elastomeric material of said flexible spring wall with said hoop elastomeric material of said at least one girdle hoop being selected from the group consisting of natural rubber, synthetic rubber and thermoplastic elastomer, said inner core being formed from a polymeric material that is different from said elastomeric material of said flexible spring wall and said hoop elastomeric material of said outer casing with at least one of a harder durometer, a greater rigidity and an increased strength relative to said elastomeric material of said flexible spring wall and said hoop elastomeric material of said outer casing.

2. A flexible spring member according to claim 1 further comprising a first mounting bead at least partially formed from said elastomeric material of said flexible spring wall along said first end of said flexible spring wall, said first mounting bead including a bead core at least partially embedded within said elastomeric material thereof.

3. A flexible spring member according to claim 2 further comprising a second mounting bead at least partially formed from said elastomeric material of said flexible spring wall along said second end of said flexible spring wall, said second mounting bead including a bead core at least partially embedded within said elastomeric material thereof.

4. A flexible spring member according to claim 1, wherein said hoop elastomeric material of said at least one girdle hoop includes at least one of a harder durometer, a greater stiffness and an increased strength relative to said elastomeric material of said flexible spring wall.

5. A flexible spring member according to claim 1, wherein said inner core is a solid annular ring having an approximately circular cross-sectional shape with said polymeric material selected from the group consisting of polyamide, polyester, polyurethane and polypropylene.

6. A flexible spring member comprising:
a flexible spring wall at least partially formed from an elastomeric material, said flexible spring wall having a longitudinal axis and extending longitudinally between opposing first and second ends, said flexible spring wall extending peripherally about said longitudinal axis and including a plurality of convoluted wall portions disposed in longitudinally-spaced relation to one another; and,
at least one girdle hoop in the form of an annular ring extending peripherally about said longitudinal axis and positioned longitudinally between adjacent ones of said plurality of convoluted wall portions with said at least one girdle hoop at least partially embedded within said flexible spring wall, said at least one girdle hoop including an inner core and an outer casing, said outer casing being at least partially formed from a hoop thermoplastic material selected from the group consisting of polyamide, polyester, polyurethane and polypropylene, and said inner core being formed from a core thermoplastic material having at least one of a harder durometer, a greater rigidity and an increased strength relative to said hoop thermoplastic material of said outer casing.

7. A flexible spring member according to claim 6, wherein said inner core is a solid polymeric ring having an approximately circular cross-sectional shape with said core thermoplastic material selected from the group consisting of polyamide, polyester, polyurethane and polypropylene.

8. A flexible spring member according to claim 6 further comprising a first mounting bead at least partially formed from said elastomeric material of said flexible spring wall along one of said first and second ends of said flexible spring wall, said mounting bead including a bead core at least partially embedded within said elastomeric material thereof.

9. A flexible spring member according to claim 8 further comprising a second mounting bead at least partially formed from said elastomeric material of said flexible spring wall along the other of said first and second ends of said flexible spring wall, said second mounting bead including a bead core at least partially embedded within said elastomeric material thereof.

10. A flexible spring member according to claim 6, wherein said hoop thermoplastic material has at least one of a harder durometer, a greater stiffness and an increased strength relative to said elastomeric material of said flexible spring wall.

11. A gas spring assembly comprising:
a first end member configured for securement to an associated structural component;
a second end member spaced from said first end member such that a longitudinal axis is formed therebetween, said second end member configured for securement to another associated structural component; and,
a flexible spring member including:
a flexible spring wall at least partially formed from an elastomeric material, said flexible spring wall extending lengthwise between opposing first and second ends and peripherally about said longitudinal axis with said first end secured in a substantially fluid-tight manner to said first end member and said second end secured in a substantially fluid-tight manner to said second end member such that a spring chamber is at least partially formed therebetween, said flexible spring wall including a first convoluted wall portion and a second convoluted wall portion spaced longitudinally from said first convoluted wall portion; and, a girdle hoop extending peripherally about said longitudinal axis and positioned between said first and second convoluted wall portions, said girdle hoop at least partially embedded within said flexible spring wall and operative to substantially inhibit radially-outward expansion of said flexible spring wall during use of said gas spring assembly, said girdle hoop including an inner core and an outer casing that is at least partially formed from a hoop elastomeric material, said hoop elastomeric material being different from said elastomeric material of said flexible spring wall and selected from the group consisting of natural rubber, synthetic rubber and thermoplastic elastomer, said inner core being formed from a polymeric material that is different from said elastomeric material of said flexible spring wall and said hoop elastomeric material of said outer casing with at least one of a harder durometer, a greater rigidity and an increased strength relative to said elastomeric material of said flexible spring wall and said hoop elastomeric material of said outer casing.

12. A gas spring assembly according to claim 11, wherein said flexible spring member includes a first mounting bead at least partially formed from said elastomeric material of said flexible spring wall along said first end of said flexible spring wall, said first mounting bead including at least one bead core at least partially embedded within said elastomeric material of said first mounting bead.

13. A gas spring assembly according to claim 12, wherein said first end member includes an end member wall with an outer peripheral edge deformed at least partially around said first mounting bead.

14. A gas spring assembly according to claim 12, wherein said flexible spring member includes a second mounting bead at least partially formed from said elastomeric material of said flexible spring wall along said second end of said flexible spring wall, said second mounting bead including at least one bead core at least partially embedded within said elastomeric material of said second mounting bead.

15. A gas spring assembly according to claim 14, wherein said second end member includes an end member wall with an outer peripheral edge deformed at least partially around said second mounting bead.

16. A suspension system comprising:
a pressurized gas system including a pressurized gas source and a control device; and,
at least one gas spring assembly according to claim 11 disposed in fluid communication with said pressurized gas source through said control device such that pressurized gas can be selectively transferred into and out of said spring chamber.

17. A gas spring assembly comprising:
a first end member configured for securement to an associated structural component;
a second end member spaced from said first end member such that a longitudinal axis is formed therebetween, said second end member configured for securement to another associated structural component; and,
a flexible spring member including:
a flexible spring wall at least partially formed from an elastomeric material, said flexible spring wall extending lengthwise between opposing first and second ends and peripherally about said longitudinal axis with said first end secured in a substantially fluid-tight manner to said first end member and said second end secured in a substantially fluid-tight manner to said second end member such that a spring chamber is at least partially formed therebetween, said flexible spring wall including a first convoluted wall portion and a second convoluted wall portion spaced longitudinally from said first convoluted wall portion; and,
a girdle hoop extending peripherally about said longitudinal axis and positioned between said first and second convoluted wall portions, said girdle hoop at least partially embedded within said flexible spring wall and operative to substantially inhibit radially-outward expansion of said flexible spring wall during use of said gas spring assembly, said girdle hoop including an inner core and an outer casing that is at least partially formed from a hoop thermoplastic material selected from the group consisting of polyamide, polyester, polyurethane and polypropylene, said inner core including a solid polymeric ring that is at least partially formed from a core thermoplastic material selected from the group consisting of polyamide, polyester, polyurethane and polypropylene with said core thermoplastic material including at least one of a harder durometer, a greater stiffness and an increased strength relative to said hoop thermoplastic material of said outer casing.

18. A gas spring assembly according to claim 17, wherein said flexible spring member includes a first mounting bead at least partially formed from said elastomeric material of said flexible spring wall along said first end of said flexible spring wall, said first mounting bead including at least one bead core at least partially embedded within said elastomeric material of said first mounting bead.

19. A gas spring assembly according to claim 18, wherein said first end member includes an end member wall with an outer peripheral edge deformed at least partially around said first mounting bead.

20. A gas spring assembly according to claim 18, wherein said flexible spring member includes a second mounting bead at least partially formed from said elastomeric material of said flexible spring wall along said second end of said flexible spring wall, said second mounting bead including at least one bead core at least partially embedded within said elastomeric material of said second mounting bead.

21. A gas spring assembly according to claim 20, wherein said second end member includes an end member wall with an outer peripheral edge deformed at least partially around said second mounting bead.

22. A suspension system comprising:
a pressurized gas system including a pressurized gas source and a control device; and,
at least one gas spring assembly according to claim 17 disposed in fluid communication with said pressurized gas source through said control device such that pressurized gas can be selectively transferred into and out of said spring chamber.

* * * * *